United States Patent
Sundal

(10) Patent No.: US 12,204,058 B2
(45) Date of Patent: Jan. 21, 2025

(54) RADON GAS SENSOR

(71) Applicant: Airthings ASA, Oslo (NO)

(72) Inventor: Bjørn Magne Sundal, Oslo (NO)

(73) Assignee: Airthings ASA, Oslo (NO)

( * ) Notice: Subject to any disclaimer, the term of this patent is extended or adjusted under 35 U.S.C. 154(b) by 187 days.

(21) Appl. No.: 18/027,362

(22) PCT Filed: Sep. 21, 2021

(86) PCT No.: PCT/EP2021/075941
§ 371 (c)(1),
(2) Date: Mar. 20, 2023

(87) PCT Pub. No.: WO2022/063776
PCT Pub. Date: Mar. 31, 2022

(65) Prior Publication Data
US 2023/0384463 A1 Nov. 30, 2023

(30) Foreign Application Priority Data
Sep. 22, 2020 (GB) .................................... 2014948

(51) Int. Cl.
G01T 1/167 (2006.01)
G01T 1/178 (2006.01)
G01T 1/24 (2006.01)

(52) U.S. Cl.
CPC .............. G01T 1/167 (2013.01); G01T 1/178 (2013.01); G01T 1/248 (2013.01)

(58) Field of Classification Search
CPC .......... G01T 1/167; G01T 1/178; G01T 1/248
See application file for complete search history.

(56) References Cited

U.S. PATENT DOCUMENTS

| 5,489,780 A | 2/1996 | Diamondis |
| 11,275,183 B2 * | 3/2022 | Gordon .................. G01T 1/185 |
| 2009/0230305 A1 | 9/2009 | Burke et al. |

FOREIGN PATENT DOCUMENTS

| CN | 111 522 053 A | 8/2020 |
| EP | 0 313 716 A1 | 5/1989 |

(Continued)

OTHER PUBLICATIONS

International Search Report and Written Opinion for PCT/EP2021/075941, mailed Jan. 5, 2022, 24 pages.

(Continued)

*Primary Examiner* — Dani Fox
*Assistant Examiner* — Fani Polyzos Boosalis
(74) *Attorney, Agent, or Firm* — Klarquist Sparkman, LLP

(57) ABSTRACT

A radon gas sensor comprising: a diffusion chamber; a photodiode positioned inside the diffusion chamber; and a photomultiplier positioned inside the diffusion chamber; wherein a scintillating material is provided on at least a part of an inner surface of the diffusion chamber. The photomultiplier detects more alpha particles, but cannot distinguish the energies of different alpha particles. On the other hand, the photodiode can distinguish different decays because the magnitude of the signal generated by the photodiode is proportional to the kinetic energy of the alpha particle striking it. Thus, the photodiode produces spectral data. The spectral data is used to estimate the amount of Polonium that is adhering to aerosols. This is used to apply a correction factor to the data to provide a better estimate of the true Radon concentration in the chamber. This can be combined with the count data of the photomultiplier for overall improved data.

25 Claims, 4 Drawing Sheets

(56) References Cited

FOREIGN PATENT DOCUMENTS

Figure 1:
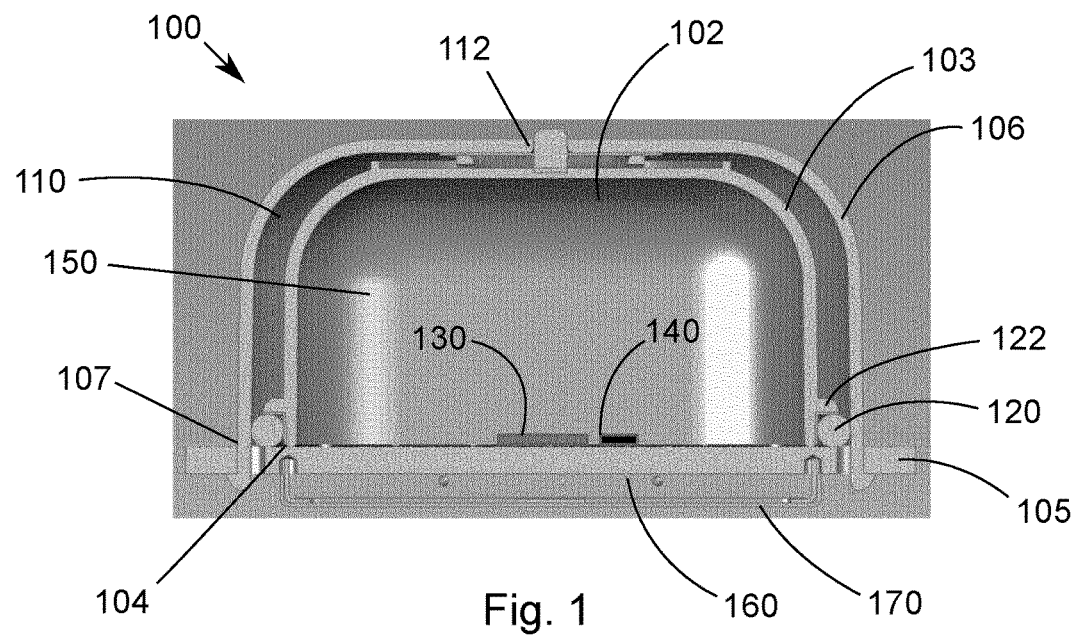

WO       WO 89/04499       5/1989
WO    WO 2008/080753    7/2008

OTHER PUBLICATIONS

IPO Search Report under Section 17(5) for GB2014948.0, mailed Mar. 15, 2021, 3 pages.
Nevinsky et al., "SSNTDs in the automatic detector of radon," *Radiation Measurements, Elsevier*, vol. 39, No. 1, Jan. 1, 2005, pp. 115-119.

* cited by examiner

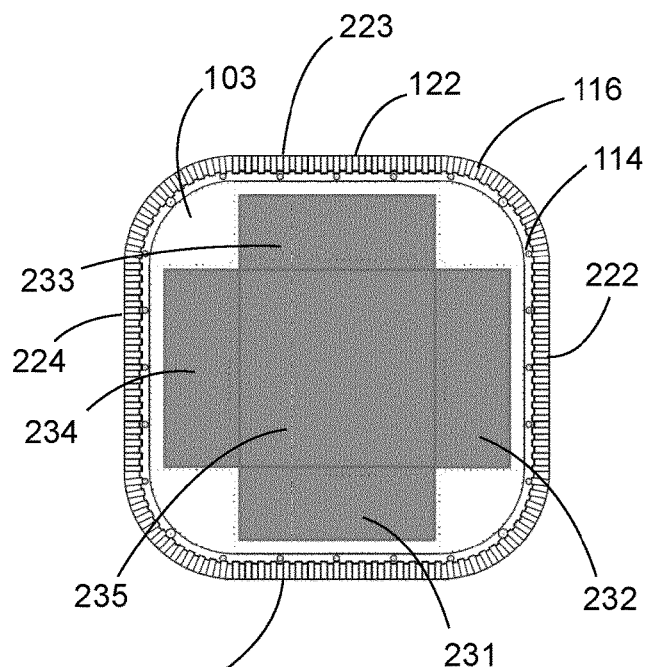
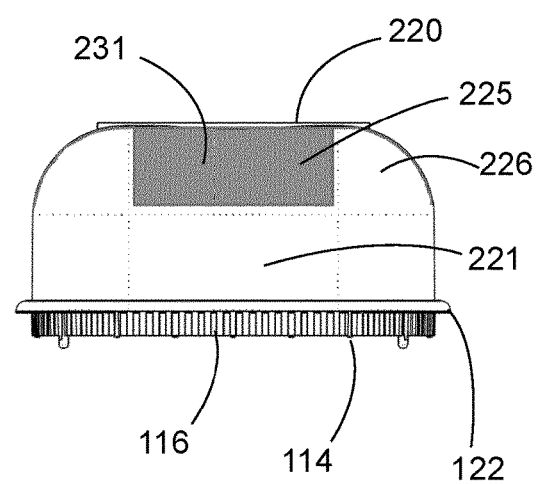
Fig. 4a          Fig. 4b
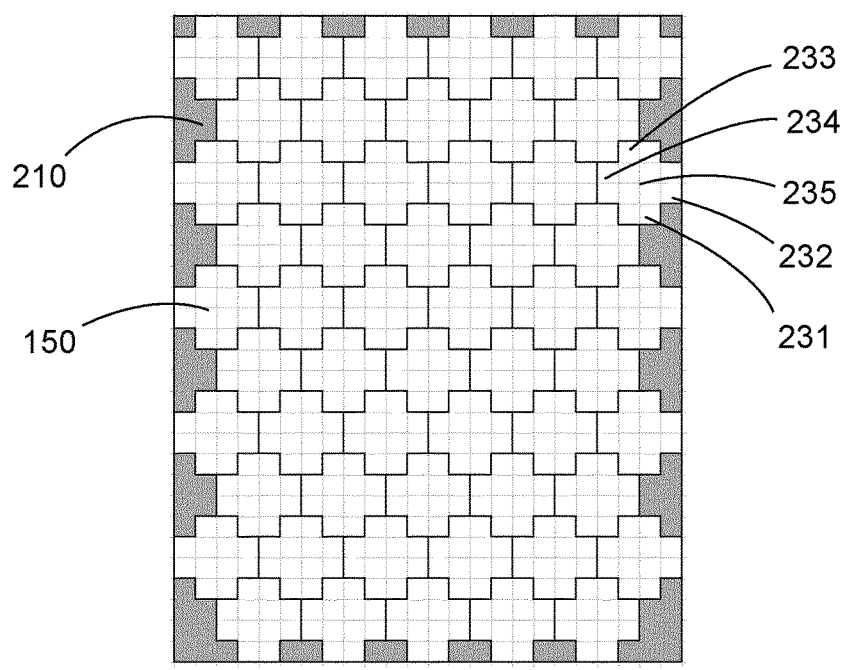
Fig. 4c

RADON GAS SENSOR

CROSS REFERENCE TO RELATED APPLICATIONS

This is the U.S. National Stage of International Application No. PCT/EP2021/075941, filed Sep. 21, 2021, which was published in English under PCT Article 21 (2), which in turn claims the benefit of Great Britain Application No. 2014948.0, filed Sep. 22, 2020.

The present invention relates to radon gas sensors.

Radon is a radioactive element which at normal temperature and pressure is a gas. It is colourless, odourless and tasteless which means that its presence and concentration is not readily detectable by human beings. However, due to its radioactivity, it can be harmful if the concentration is too high. At normal concentrations, radiation from radon typically accounts for around half of a person's annual natural radiation dose.

The most stable isotope of radon is radon-222 which has a half life of 3.8 days and is produced as part of the decay chain of uranium-238 which is present throughout the Earth's crust. Being a noble gas, radon readily diffuses out of the ground and into the air around us. The daughter products of radon decay tend to be charged particles which will readily stick to dust or smoke particles in the air. When these particles are inhaled, they can lodge in the lungs and the subsequent radiation from decay of the radon daughter products causes a risk of lung cancer. Consequently, higher concentrations of radon lead to higher risks of cancer.

The concentration of radon in the atmosphere depends, amongst other things, on ventilation. Areas with good ventilation will have lower radon concentrations, whereas a lack of ventilation leads to radon accumulation and thus increases the radiation level in such areas. Radon levels outside therefore tend to be lower than inside buildings. For example, typical radiation doses from radon may be around 10-20 $Bq/m^3$ outside and may be around 100 $Bq/m^3$ inside. Radon levels can also vary significantly due to variations in geographic location (e.g. different geologies), or due to differences in building materials.

Radon decays by emission of an alpha particle with an energy of 5.5 MeV. The resultant Polonium-218 has a half life of about 3 minutes before emitting an alpha particle of 6.0 MeV. The resultant Lead-214 has a half life of around 27 minutes before beta-decaying to Bismuth-214 which in turn has a half life of 20 minutes and beta-decays to Polonium-214. Polonium-214 has a half life of about 164 microseconds before emitting an alpha particle of 7.7 MeV resulting in Lead-210 which has a half life of 22 years and is thus relatively stable.

Detection of radon to date has been divided into two main methods. The first method is active detection of alpha particles using a photodiode and the second method is passive detection of alpha particles using a track detector. Typically the first method requires a large instrument and needs electrical power to be supplied. Such instruments have typically only been used for larger scale, e.g. commercial or industrial measurements as the instruments are more bulky and expensive. The photodiode (e.g. a PIN diode) is placed in a diffusion chamber of the device. Alpha particles hitting the photodiode create a number of electron-hole pairs which will cause a small current to be generated. These current signals can be detected and counted to provide a measure of the radon concentration within the diffusion chamber. Such active measurements can be provided continuously in time rather than having to wait for the results of a laboratory analysis.

The second method uses much smaller detectors with no power requirement and is thus much more suited to domestic customers. A passive (i.e. unpowered) track chamber is typically placed in a selected location and left for a predetermined period of time (typically from a few weeks and up to about 3 months) after which it is sent back to a lab for analysis. Alpha particles emitted within the chamber leave tracks on a film which is also disposed within the chamber. These tracks can be detected in the lab and counted thus providing a measure of the radon concentration in the air within the chamber.

WO 2008/080753 describes a passive radon detector device with a diffusion chamber rotatably mounted above the detector so that it can be rotated in and out of the "ON" position above the detector. When the chamber is in position above the detector, the detector will detect alpha particles from gas which diffuses into the chamber. When the chamber is rotated out of position (the "OFF" position), the detector is covered (the chamber volume is essentially reduced to zero) and is therefore effectively isolated from radon in the surrounding environment.

US 2009/0230305 describes an active radon detector device which is battery powered. The photodiode detector is mounted on the main PCB and is covered by a sampling chamber, also mounted on the main PCB. Air enters and leaves the sampling chamber through apertures in the PCB. These apertures are optionally covered by a filter to exclude undesired debris such as smoke, dust, and the like.

U.S. Pat. No. 5,489,780 describes another active radon detector device in which a pressed metal filter is used as the wall of the diffusion chamber. This filter is mounted directly on the PCB over the photodiode detector, thus defining the sampling volume.

Another known type of active radon detector is a Lucas cell. A Lucas cell is a chamber in which a gas sample is collected, the inside of the chamber being coated with a scintillating material such as Silver-doped Zinc Sulphide. This scintillating material emits light when struck by alpha particles. A photomultiplier tube is arranged to view the inside of the chamber (e.g. through a window) and counts the light flashes caused by the scintillation, thereby counting the number of alpha particle disintegrations.

According to one aspect of the invention, there is provided a radon gas sensor comprising:
  a diffusion chamber;
  a photodiode positioned inside the diffusion chamber; and
  a photomultiplier positioned inside the diffusion chamber;
    wherein a scintillating material is provided on at least a part of an inner surface of the diffusion chamber.

Ordinarily, photodiodes and photomultipliers are used in different types of radon detector. Photodiodes are placed inside a diffusion chamber and one or both of the photodiode and the diffusion chamber are electrically biased to create an electric field between them. For example, the photodiode may be negatively biased while the diffusion chamber wall is positively biased, creating an electric field which will draw positively charged particles towards the photodiode. The benefit of this particular arrangement is that the photodiode only produces a signal when an alpha particle actually hits the photodiode. Given that an individual alpha decay generates only one alpha particle in a random direction and the photodiode sensor represents a small fraction of the area within the diffusion chamber, the hit rate due simply to directly targeted alpha particles is quite low. The presence of the electric field significantly increases the detection rate. This is because the majority of the daughter products generated after an alpha decay are positively charged and can therefore be drawn by the electric field onto the surface of the photodiode. Once landed on the photodiode, there is a 50% chance of any subsequent decay hitting the photodiode and generating a signal.

By contrast, Lucas cell detectors using photomultipliers do not need the formation of an electric field. The mechanism for detection is that an alpha particle hitting the scintillating material causes the emission of a number of photons in many directions simultaneously. Some of these photons will be directed at the photomultiplier which will accordingly generate a signal, thereby detecting the alpha particle. The detection efficiency of a Lucas cell detector is improved by increasing the area of the chamber which is covered in scintillating material so as to maximise the chance of a decay (which is randomly directed) hitting the scintillating material. Lucas cells are often used in a "grab sample" operation in which a volume of gas is trapped in the cell and isolated while measurements are taken. However, Lucas cells have also been used in a flow mode for more continuous measurements.

The arrangement of this invention recognises that the two sensors provide different information. In particular, the Lucas cell detection method cannot distinguish the energies of different alpha particles. Therefore an alpha particle derived from a Radon decay is indistinguishable from the alpha particle derived from a Polonium decay. If the Polonium atoms can be assumed to originate from a Radon decay within the chamber, then a count of all alpha particles detected still gives a good measurement of the Radon concentration. However, as noted above, the daughters of radon decays are generally charged particles and therefore have a much greater tendency to attach to other particles, e.g. dust or smoke particles or other large aerosols within the chamber. Attachment to such particles can reduce the likelihood of the Polonium alpha decay reaching the scintillating material (e.g. if it is emitted directly into the attached molecule) and therefore the ratio of Radon alphas to Polonium alphas changes with the air quality in the chamber. The Lucas cell cannot detect this and therefore the measurement may be compromised to some extent or may need to be compensated by drawing on other sensor data. On the other hand, the photodiode can distinguish different decays. The magnitude of the signal generated by the photodiode is proportional to the kinetic energy of the alpha particle striking it. In other words, the photodiode produces spectral data (an energy spectrum). The energies of the various decays are well known. In particular, for the Polonium daughters that have been drawn onto the sensor surface by the electric field, no energy is lost through movement in air, so the detected energy very closely matches the known energies of the Polonium decays. Thus the energy spectrum detected by the photodiode will generally show very strong peaks at 6.0 MeV and 7.7 MeV corresponding to the Polonium-218 and Polonium-214 decays respectively. When these decays can be assumed to have originated from a Radon decay within the chamber (as is ensured by the diffusion path) this data can give a very accurate measure of the Radon concentration within the chamber. Moreover, the Radon decays themselves are also detected by the photodiode, although these are spread across an energy band due to the fact that alpha particles lose energy through collision with air molecules (at a rate of about 1 MeV per centimetre). Thus if the longest path from the corner of the diffusion chamber to the photodiode is about 3 cm, then the Radon decays will be spread across an energy band of about 2.5 MeV to 5.5 MeV (the upper limit being the maximum energy of a Radon decay and the lower limit being reduced by the maximum path length). The difference between these measurements (that of Radon decays and that of Polonium decays) can be used to measure the amount of Polonium reaching the sensor. Using knowledge of the electric field strength and the geometry of the diffusion chamber, this data can be used to estimate the amount of Polonium that is adhering to aerosols and therefore provides an indication of the level of aerosols in the chamber. This can be used to apply a correction factor to the data to provide a better estimate of the true Radon concentration in the chamber.

A drawback of the photodiode arrangement is that the number of disintegrations detected is lower than that of a Lucas cell of equivalent dimensions. Accordingly, it takes time to build up sufficient data to provide a measurement with low enough uncertainty to be useful (or alternatively, it can provide measurements early, but with high associated uncertainty). The accuracy of the short term measurements is therefore also lower. While long term measurements are good for giving an indication of overall exposure in a location, short term measurements can be useful for taking into account short term variations in Radon concentration, e.g. as caused by the switching on and off of ventilation equipment or the opening and closing of windows and doors.

The invention recognises that placing a photomultiplier in the diffusion chamber together with a photodiode, while providing scintillating material on the inside surface of the diffusion chamber allows a combination detector to be formed in which alpha particles striking the scintillating material on the diffusion chamber walls (i.e. those not striking the photodiode) can be additionally detected by the photomultiplier, thereby adding to the gross count of alpha disintegrations. While this additional data is not spectral like the data from the photodiode, it does add to the overall count and therefore reduces the uncertainty in short term measurements, thereby allowing a more accurate shorter term measurement to be provided to the user. Moreover, the spectral data from the photodiode can still be used to calculate correction factors that can be used to compensate the data acquired from the photomultiplier, thereby adding to the measurement accuracy over all timescales by enhancing the data acquired by the photomultiplier.

The two sensors (photodiode and photomultiplier) can be located anywhere within the diffusion chamber. As they require electrical connections, they are preferably located on a printed circuit board which is either placed within or forms part of the chamber (whereas in Lucas cells, the photomultiplier can be located outside the chamber so long as it has a window through which to view the inside). However, a preferred arrangement is that the photodiode is positioned centrally with respect to the diffusion chamber. In other words the photodiode is positioned symmetrically within the diffusion chamber. An advantage of locating the photodiode centrally is to reduce the maximum distance travelled by an alpha particle from the farthest corner of the diffusion chamber to the sensor. Locating the sensor symmetrically within the diffusion chamber makes the statistical analysis less complex and also ensures symmetry of the electric field that is formed between the photodiode and the diffusion chamber wall.

These benefits of central location and symmetry apply less to the photomultiplier as the detection mechanism is less directional. The electric field does not have any effect on the photons travelling from the scintillating material to the photomultiplier and the photons are emitted in all directions such that some will be received, no matter where the photomultiplier is positioned. Accordingly, the photomultiplier may be positioned offset with respect to the diffusion chamber. The photomultiplier may be positioned adjacent to, but offset from the photodiode.

Placing the photomultiplier adjacent to the photodiode may be advantageous for providing a Faraday cage around the sensors. The electronic circuits used to acquire, amplify and process the signals from the sensors can generate unwanted noise that could interfere with the sensors themselves. It is therefore desirable to provide a Faraday cage that separates the electronics from the sensors (and indeed that separates the sensors from other sources of noise. Accordingly, in some embodiments the printed circuit board (PCB) on which the sensors are mounted may comprise a substantially continuous conductive layer surrounding the sensors and extending out to (and electrically contacting) the conductive inner surface of the diffusion chamber. The PCB and the inner surface of the diffusion chamber then together form a Faraday cage around the sensors. As this Faraday cage is electrically biased so as to from the electric field for the photodiode, it is necessary for the sensors to be electrically isolated from this conductive layer of the PCB and so they are mounted within a hole in that conductive layer. Mounting the two sensors adjacent to one another, within the same hole may be efficient in terms of reducing the total size of hole in the Faraday cage (as compared with forming each sensor in its own separate hole).

It will be appreciated that the two sensors could be mounted to separate PCBs, each with its own electrical connection to processing circuitry. A Faraday cage could be arranged around the two separate PCBs. However, for simplicity of design and ease of manufacture as well as optimisation of the chamber volume, it is preferred that the photodiode and the photomultiplier are mounted to the same printed circuit board. It may be noted that even when mounted to the same circuit board, the photodiode and the photomultiplier may be provided with separate signal channels and separate amplifiers, each optimised for the respective sensor.

The PCB may be mounted within the diffusion chamber, i.e. where the diffusion chamber is a separate structure from the PCB. However, in some embodiments the printed circuit board forms part of the diffusion chamber. For example the PCB may form one wall of the diffusion chamber with the remaining structure of the diffusion chamber being mounted to the PCB. A diffusion path must of course be provided by which air can enter the diffusion chamber (while blocking light that could interfere with the sensors), but there are advantages to the PCB forming part of the diffusion chamber such as facilitating the electrical connections that create the electric field and/or the Faraday cage as discussed above.

While it could be possible to transmit the detector signals (direct from the photodiode and the photomultiplier) to a separate device for analysis, the signals from the sensors are generally very small and are best amplified and processed locally so as to avoid further deterioration of the signal. Therefore in some embodiments the radon gas sensor further comprises: sensor electronics arranged to receive photodiode data from the photodiode and arranged to receive photomultiplier data from the photomultiplier. The data may initially be received as analogue signals that are amplified by amplifiers and then digitised for further analysis in a microcontroller. The data may be stored for analysis and for later output.

The sensor electronics may be arranged to combine the photodiode data with the photomultiplier data. As discussed above, the combination of the two sets of data allows improvements in accuracy over the short term and long term. In particular the alpha counts from each data set may be merged to create a total count value that is greater than each individual count and thus has less statistical uncertainty.

The sensor electronics may be arranged to generate an event count from the photomultiplier data and arranged to generate an energy spectrum from the photodiode data. The event count may be a simple count of the number of scintillation events that have occurred (and been detected by the photomultiplier), i.e. representative of the number of times an alpha particle has hit the scintillating material, each such event being representative of an alpha disintegration event. The energy spectrum may be a more detailed representation of the energy spectrum of the disintegration events detected by the photodiode. This energy spectrum may take different forms, but for example may be a series of energy bins each corresponding to a range of energies, with each detected disintegration being stored in the bin corresponding to its detected energy.

As discussed above, the sensor electronics may be arranged to combine the event count from the photomultiplier data with the energy spectrum from the photodiode data to generate a sensor output. The data may of course be combined in a number of different ways and several outputs may be provided if desired. For example the sensor output may include a short term average based on the gross count of disintegration events from both the photodiode and the photomultiplier within a certain time window. The sensor output may additionally or alternatively include a long term average based on the gross count of disintegration events from both the photodiode and the photomultiplier within a different, longer time window. These outputs may be the counts themselves, or average counts over a time period, or may be scaled, e.g. to correspond to an estimated radioactivity dose.

The sensor electronics may be arranged to apply one or more correction factors to the event count and the energy spectrum, wherein the one or more correction factors are calculated only from the energy spectrum. As discussed above, the energy spectrum data provides more detail that can be used in analysis, e.g. to estimate the presence of aerosols. For example the count data can be affected by factors such as temperature, humidity, the presence of aerosols such as dust, smoke or VOCs (volatile organic compounds). The energy spectrum data can be used to estimate the effect that these are having on the detection efficiency of the sensors and can therefore be used to provide a correction factor that, when applied to the gross count data, provides a better estimate of the actual Radon gas concentration. It will be appreciated that the term "only" is used here (when referring to the correction factors being calculated only from the energy spectrum) to mean that the data (i.e. the event count) from the photomultiplier is not used in these calculations. It is not intended to exclude the possibility that other sensors such as thermometer, humidity or VOC sensors for example could also be used to feed in to the correction factor if such data is available. However, where such sensor data is not available, it is also possible that the photodiode data may be the sole contributor to the correction factor calculation.

Some non-limiting examples of correction factors that can be calculated from the energy spectrum data are: humidity correction factor, aerosol correction factor, cosmic background radiation correction factor.

The photodiode is not only sensitive to alpha particles, but is also sensitive to light. Therefore some of the light emitted by the scintillating material will fall on the photodiode resulting in a signal. It is desirable that this does not lead to a double count. However, in fact the signal level generated by the photodiode due to the light from the scintillating material is much smaller than the signal for an alpha particle. In fact, it is generally (depending on the geometry of the diffusion chamber) much lower even than the lowest energy alpha particle that can strike the photodiode. Therefore the two signals can easily be distinguished. In some embodiments therefore the sensor electronics are arranged to register an alpha particle count on the photodiode only when the energy is above a threshold value. The threshold value can be set to separate the energy levels of the alpha particles from the energy levels of received light. The threshold may be higher than the energy of a light flash generated by an alpha particle hitting the scintillating material. The threshold may be lower than minimum expected energy of a radon alpha decay hitting the photodiode.

With the light signal suitably separated and distinguished from the alpha particle signal, an alpha particle that hits the scintillating material and gets counted by the photomultiplier does not get counted by the photodiode. Likewise, there is no mechanism by which an alpha particle striking the photodiode can be detected by the photomultiplier, so there is no double counting with the two sensors.

As discussed above, the photodiode operates best when in the presence of a strong electric field to guide charged daughter products (also referred to as "progenies") towards the sensor. This electric field can be provided by applying a bias voltage to one or more of the photodiode and the inside surface of the diffusion chamber. Thus the radon gas sensor may further comprise a photodiode bias circuit arranged to apply a photodiode bias voltage to the photodiode. Similarly, the inner surface of the diffusion chamber may be conductive and the sensor may further comprise a diffusion chamber bias circuit arranged to apply a diffusion chamber bias voltage to the inner surface of the diffusion chamber. The sensor electronics can provide the relevant bias voltages. In some embodiments both the photodiode and the inner surface of the diffusion chamber may be biased and in opposite directions so as to increase the strength of the electric field. For example the photodiode may be negatively biased while the inner surface of the diffusion chamber is positively biased. This allows the total voltage difference that determines the electric field to be split and thereby makes the electronics to generate the bias voltages simpler. The bias voltage for the photodiode may be limited by the voltage that the component can withstand. In some embodiments the photodiode is rated to withstand a bias voltage of −70 Volts. However, where the inner surface of the diffusion chamber is also biased to +100 Volts (for example), the electric field strength is based on a total potential difference of 170 Volts.

Similarly, the radon gas sensor may further comprise a photomultiplier bias circuit arranged to apply a photomultiplier bias voltage to the photomultiplier. This bias voltage may simply be a small bias voltage to put the semiconductor sensor into the operational region. The photomultiplier bias voltage is typically different to both of the above bias voltages.

The scintillating material can be applied to the inner surface of the diffusion chamber in any suitable way. For example it may be painted on or sprayed or coated by any number of deposition processes. However, in some embodiments the scintillating material is provided on a sheet attached to the inside surface of the diffusion chamber. Using a sheet to attach to the diffusion chamber is particularly cost effective as sheets of certain suitable scintillating materials (such as silver-doped Zinc Sulphide) are readily available. Additionally, the assembly process can be kept simple and cost effective. The sheet may be adhered to the diffusion chamber via application of an adhesive. The adhesive could be applied in a separate process step, either to the diffusion chamber before application of the sheet to the adhesive, or to the sheet before application of the sheet to the diffusion chamber. The sheet may be pre-formed with an adhesive backing (optionally with a release sheet to protect the adhesive until the time of use and that can be peeled away to reveal the adhesive for use.

The ease with which the scintillating material can be applied to the diffusion chamber will depend to some extent on the shape of the diffusion chamber. As most diffusion chambers are to some extent dome shaped, painting, spraying and coating techniques will generally always be easily applicable. However, adhering a sheet of scintillating material is not always straightforward. For example a diffusion chamber in the form of a circular cylinder may require two separate pieces of sheet to be adhered; one circular piece for the circular ceiling of the diffusion chamber and one strip to be adhered around the circumferential wall. However, this requires two separate assembly processes which is complicated and time consuming. A cuboid shape can be efficiently covered with a cross-shaped piece of sheet where the central base of the cross is sized and shaped to adhere to the rectangular ceiling of the diffusion chamber and the legs are sized and shaped to fold down onto the four rectangular side walls. This cross-shaped piece of sheet can be attached in a single process step and is therefore more efficient. However, sharp edges and corners are undesirable in the diffusion chamber because the concentrate the electric field and increase the maximum distance from the sensor with little benefit in terms of additional chamber volume. Accordingly, a preferred shape of diffusion chamber is a cuboid with rounded edges and corners.

As discussed above, one convenient arrangement is for the diffusion chamber to be formed partly be the PCB and partly by a diffusion chamber part attached to the PCB. In such embodiments the diffusion chamber part may be formed as a dome having four planar side walls and a planar roof, all connected by rounded corners and edges. It is not necessary to provide rounding at the rim that connects to the PCB. The rim may therefore have the form of a rectangle (normally a square) with rounded corners. When this dome is placed on top of a horizontal PCB, there will be four rounded vertical edges connecting the four side walls and four rounded horizontal edges each connecting the ceiling to one side wall. The majority of these edges can be singly-curved. However, where three edges meet at a corner, the corner becomes doubly-curved. A singly-curved surface may be termed a "developable surface" or one with zero Gaussian curvature, while the doubly-curved surfaces are not "developable" and have non-zero Gaussian curvature. Attachment of a planar sheet to a doubly-curved surface causes deformation (in practice this is likely to manifest as folds or creases which could have an unpredictable light emission (the folds/creases will not be the same from one product to another) which may adversely impact the statistics of the measurements. On the other hand, a planar sheet can be readily applied across a developable (or singly-curved) surface without deformation, i.e. without folds or creases. Therefore in such embodiments, the sheet may be attached to developable surfaces of the inside of the diffusion chamber. As discussed above, the sheet may be in the form of a cross having a central rectangle (optionally square) attached to the roof and four legs each extending onto a side wall. This avoids application of the sheet to any non-developable surfaces while still covering a large proportion of the inside of the diffusion chamber with scintillating material. It does not matter that the whole surface is not covered as the geometry of the diffusion chamber and of the sheet can be well-defined so that the relative areas are well-defined. This allows the fraction of the diffusion chamber that is provided with scintillating material to be taken into account in the calculations.

It is also possible to provide scintillating material on the surface of the printed circuit board surrounding the photodiode and photomultiplier. However, this requires an additional assembly step and introduces risk of contact with or contamination of the photodiode and/or photomultiplier and the wire bonds used to connect them to the sensor electronics. Therefore in certain embodiments it is preferred that the printed circuit board does not have scintillating material provided on it.

In some embodiments the cross has a central square attached to the roof and the four legs each have a length equal to half the side length of the square. Other ratios of leg length to side length are also possible. However, this particular arrangement is convenient as it tessellates efficiently such that a large number of crosses can be cut from a sheet of material efficiently and with little wastage, thereby saving cost. Depending on the shape of the diffusion chamber, this ratio of leg length may not extend all the way down the side of the diffusion chamber side walls and may therefore not be the most efficient coverage of the inside of the diffusion chamber surface. However, the gain in sensitivity from this amount of scintillating material may still provide a significant improvement, while the cost saving of the scintillating material may justify this choice of shape.

It will be appreciated that any suitable photodiode may be used. However, in some embodiments the photodiode is a PIN diode. Such photodiodes are readily available in suitable sizes and can be surface mounted to the printed circuit board.

It will be appreciated that any suitable photomultiplier may be used. However, in some embodiments the photomultiplier is a Silicon photomultiplier. Silicon photomultipliers are small and low power and can be surface mounted to the printed circuit board.

It will be appreciated that any suitable scintillating material may be used. However, in some embodiments the scintillating material is Silver-doped Zinc Sulphide. Silver-doped Zinc Sulphide is readily available in a variety of forms, but particularly conveniently in sheet form.

According to another aspect of the invention there is provided a method of detecting radon gas comprising:
  acquiring first data from a photodiode positioned inside a diffusion chamber that has scintillating material provided on at least a part of an inner surface of the diffusion chamber; and
  acquiring second data from a photomultiplier positioned inside the diffusion chamber.

It will be appreciated that all aspects of the apparatus discussed above also apply to the method of detecting radon gas. In particular, and by way of example, it will be appreciated that preferred forms of the method may include combining the first data and the second data. For example the first data may be spectral data and the second data may be count data. The spectral data and the count data may be combined into a combined data set. Correction factors may be calculated from the spectral data. Further, as discussed above, bias voltages may be applied to the photodiode and/or photomultiplier and/or inner dome and/or outer dome.

Figure 2A:
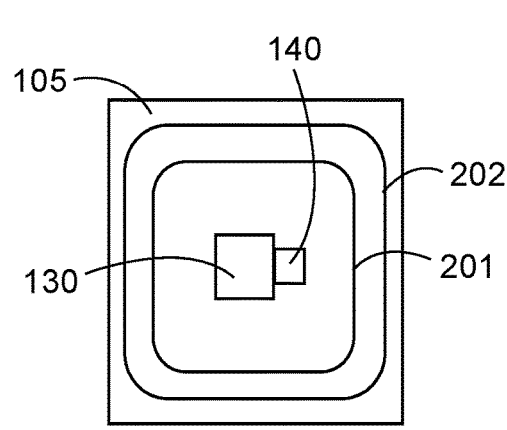
Figure 2B:
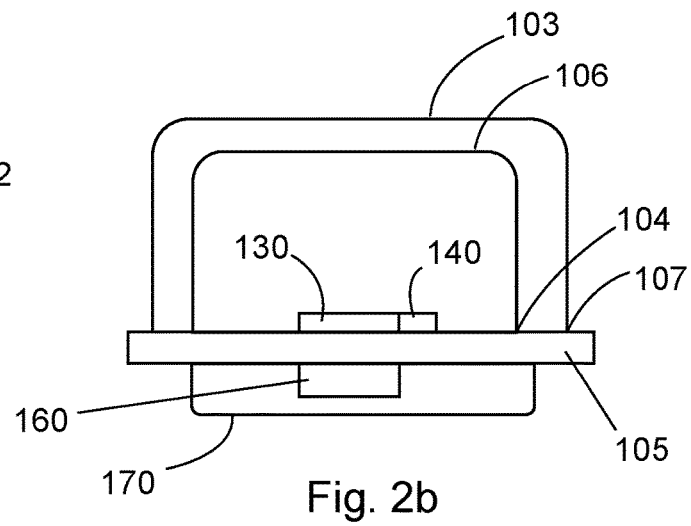
Figure 3A:
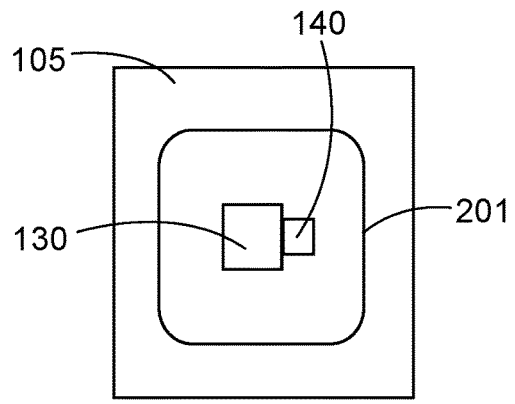
Figure 3B:
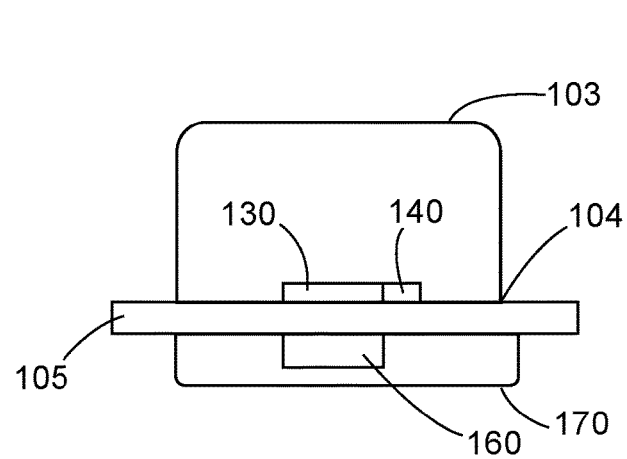
Figure 5A:
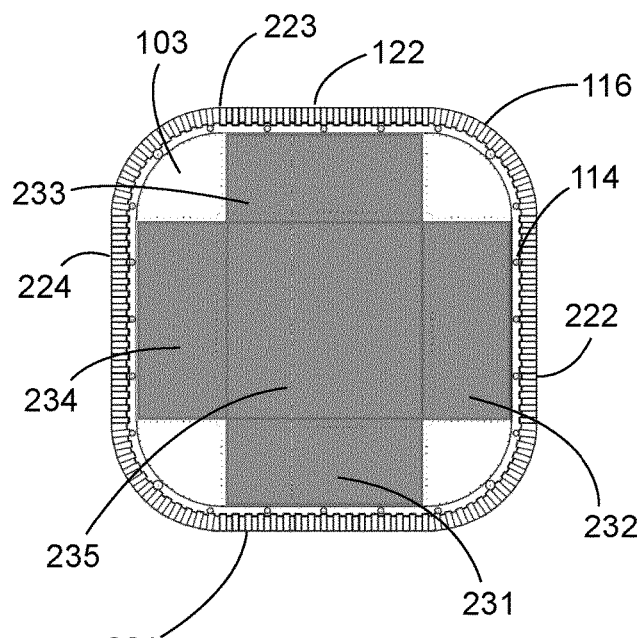
Figure 5B:
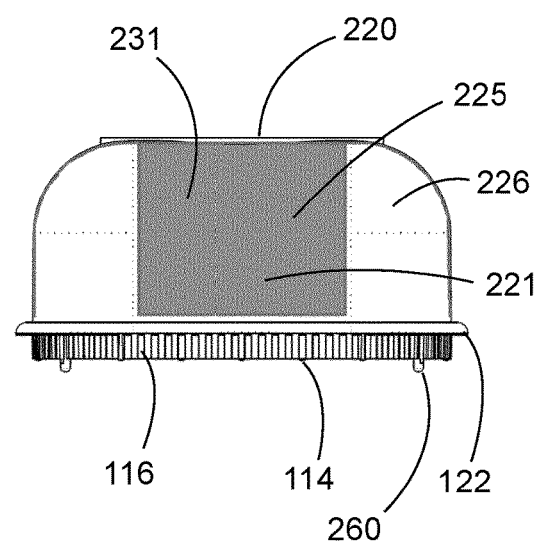
Figure 5C:
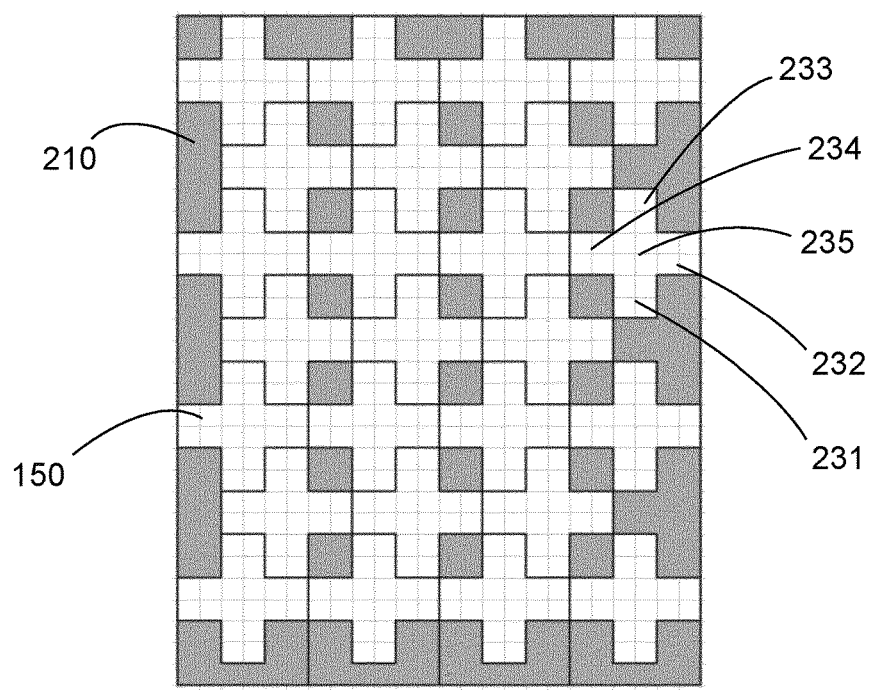
Figure 6:
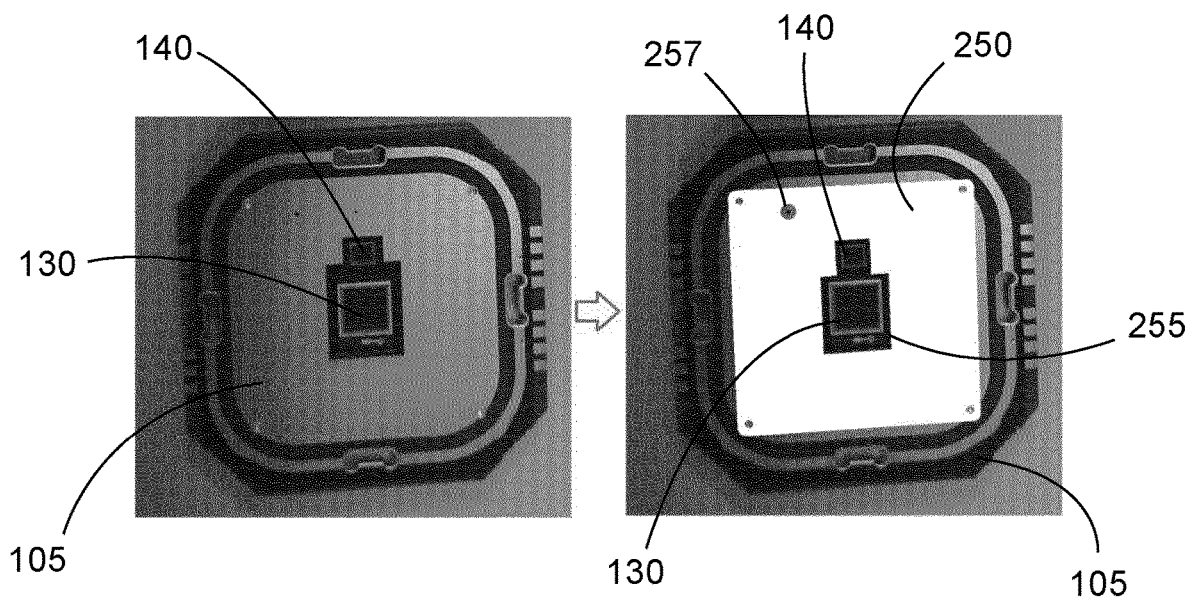
Figure 7:
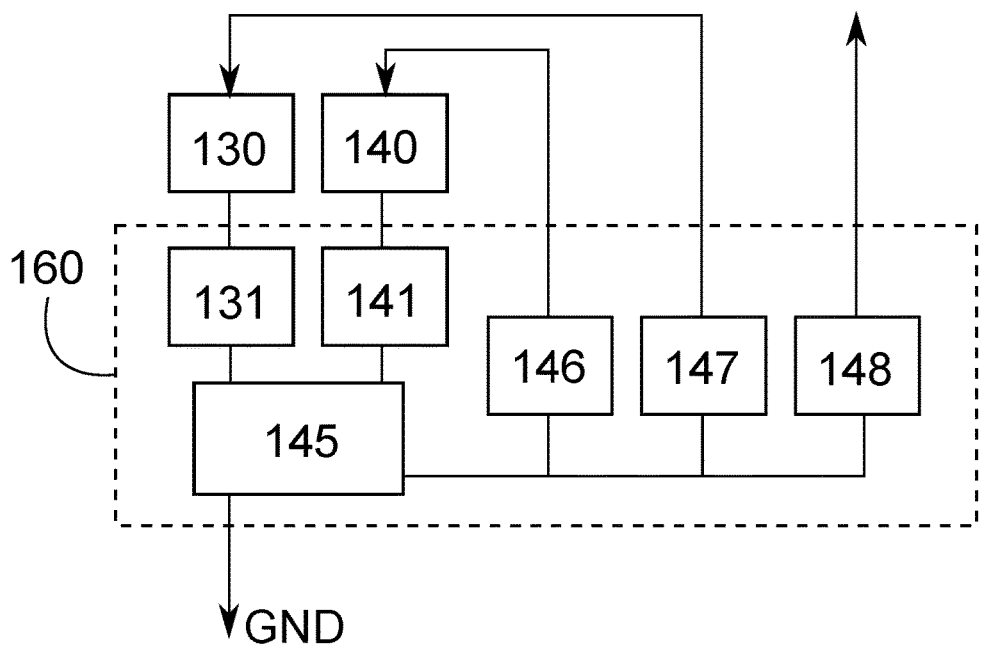

Preferred embodiments of the invention will now be described, by way of example only, and with reference to the accompanying drawings in which:

FIG. 1 shows a cross-section through a radon gas sensor;
FIGS. 2a and 2b illustrate a double-walled sensor;
FIGS. 3a and 3b illustrate a single-walled sensor;
FIGS. 4a, 4b and 4c illustrate one arrangement of scintillating material;
FIGS. 5a, 5b and 5c illustrate another arrangement of scintillating material;
FIG. 6 illustrates an additional arrangement for scintillating material; and
FIG. 7 schematically shows electronics for a radon gas sensor.

FIG. 1 shows a radon gas sensor 100 which comprises a diffusion chamber 102 formed from an inner dome 103 and a printed circuit board 105. The inner dome 103 is held in electrical contact with the printed circuit board via its rim 104 being positioned and held against a conducting trace on the surface of the printed circuit board 105. In the embodiment of FIG. 1, an outer dome 106 is also provided in electrical contact with the printed circuit board 105 via its rim 107 being positioned and held against another conducting trace on the surface of the printed circuit board 105. The outer dome 106 shields the inner dome 103 from electromagnetic pick-up as well as isolating it from potential contact (and risk of electric shock) when it is held at high potential.

Together, the inner dome 103 and outer dome 106 form a diffusion path 110 by which air can enter and exit the inner dome via an opening 112 in the roof of the outer dome 106, along the space between the two domes 103, 106 and under the rim 104 of the inner dome 103. For this purpose, the inner dome 103 may be provided with a number of rim projections 114 (visible in FIG. 4b) which extend from the rim 104 of the inner dome 103 towards the printed circuit board 105. These rim projections 114 provide electrical contact with the printed circuit board 105 while allowing air to flow under the rim 104 in the spaces between adjacent projections 114. The height of the projections and the width and spacing of the projections (i.e. the width of the gaps between projections) are contributing factors to the diffusion time for air to diffuse from outside the gas sensor 100 into the interior of the inner dome 103 (which is the sensitive volume for the purposes of the sensor 100). In this embodiment, the rim projections 114 have a height of 0.15 mm, i.e. they space the rim 104 0.15 mm from the surface of the printed circuit board 105. However, it will be appreciated that this height may be varied according to particular designs.

As is shown in FIG. 1, a gasket 120 may be provided between the inner dome 103 and the outer dome 106 and pressed against the printed circuit board 105 by a lip 122 formed on the outer surface of the inner dome 103. The gasket 120 prevents air entering the diffusion path under the rim 107 of the outer dome 106 (due to its seal against the inner surface of the outer dome 106) as well as preventing light from entering the inner dome 103 under the rims 104, 107 (due to the gasket sealing against the printed circuit board 105).

The purpose of the diffusion path 110 is to impair diffusion of radon daughter products from outside the radon gas sensor 100.

There are several factors which impair the diffusion of radon daughter products into the inner dome 103. The first is that radon daughter products are all metallic in nature (Polonium, Lead, Bismuth). These metallic atoms have a strong tendency to stick first to water vapor and other trace gases in air to form small particles, referred to as clusters. Such clusters are also referred to as unattached decay products. Subsequently, these clusters easily bind to larger 'dust' particles called aerosols in the air, at which point they may be referred to as attached decay products. Both clusters and aerosols stick readily to surfaces (in a process referred to as plate-out). In addition, the radon daughters tend to be charged particles at the point at which they are created and are subsequently neutralized by various neutralisation processes. While being charged, the process of moving the daughter products by strong electric fields helps to move them to a nearby surface where plate-out can take place. Plate-out happens easily both to charged and non-charged clusters and aerosols. As soon as the daughter products are bound to aerosols their diffusivity is much reduced and their chance of moving through the long narrow diffusion path without experiencing a plate-out event is small.

To pass from the outside of the gas sensor 100 to the inside of the inner dome 103 such particles have to pass through the opening 112 and along the narrow passage formed by the outer surface of the inner dome 103 and the inner surface of the outer dome 106.

Charged clusters and aerosols will not easily progress further along the diffusion path 112, particularly when the inner dome 103 and outer dome 106 are held at different potentials so as to create an electric field between them, thereby driving charged particles to one of the surfaces. Therefore there is a low probability that such charged particles will enter the inner dome 103. Even some non-charged aerosols and clusters may be polarized by the strong electric field between the two domes that further steer them toward one of the surfaces to increase the probability of plate-out.

The second factor is the dimensions (lengths and widths) of the various parts of the diffusion path 112. These dimensions provide obstructions to gas particles and determine a time constant for diffusion of gas along the path 112. One particular embodiment of the construction described here leads to a time constant of about 30 minutes for diffusion of radon, whereas the diffusion path provides a very difficult path for the radon daughters to traverse due to the processes of plate-out as well as their much lower diffusivity while being trapped to aerosols.

The combined half lives of the various elements in the radon decay chain from radon-222 through to lead-210 is less than an hour, i.e. about twice the time constant of the diffusion path. Radon-222 is non-reactive, uncharged noble gas and has a half life of 3.8 days (with a high diffusivity) so it can readily diffuse into the chamber along this path.

The accuracy of gas sensor 100 is significantly improved by ensuring that the alpha particles detected inside the inner dome 103 originate from radon-222 decays within the inner dome 103 (i.e. by minimising the quantity of radon daughter products entering the inner dome 103 from outside). Detected alpha particles can then all be attributed to a radon decay chain that began inside the well-defined volume of the inner dome 103 and thus can be used directly to estimate the concentration of radon gas within that volume.

For detection of alpha particles inside the inner dome 103, two separate sensors are provided on the printed circuit board 105, namely a photodiode 130 and a photomultiplier 140.

The photodiode 130, which in this embodiment is a PIN diode, operates by detecting alpha particles that collide with the sensor. Alpha particles that hit the photodiode 130 generate a small current that can be amplified and detected so that the alpha particles can be counted. Moreover, the magnitude of the current is proportional to the energy of the alpha particle which allows the photodiode to collect an energy spectrum over time. The energy spectrum is particularly useful as different decays generate alpha particles with well-known energies such that spikes in the energy spectrum can be correlated with those decays. For example, the alpha particle from a Radon decay starts with an energy of 5.5 MeV, but loses about 1 MeV per centimetre of air that it travels through. As these decays can happen anywhere within the inner dome 103, the dimensions of the dome (maximum distance from the furthest corner of the inner dome 103 to the photodiode 130) determine the lowest Radon alpha particle energy with the energies then being spread between that energy and the upper limit of 5.5 MeV for alpha particles that decay right next to the photodiode 130. When an electric field is set up (as discussed below) between the inner dome 103 and the photodiode 130, the charged daughter products are driven towards the photodiode 130 and land on the sensor surface. Therefore Polonium decays tend to either hit the photodiode at full energy or miss the photodiode completely. Therefore a 6.0 MeV spike corresponds to the Polonium-218 decay while a 7.7 MeV spike corresponds to the Polonium-214 decay.

The photomultiplier 140, which in this embodiment is a Silicon Photomultiplier (SiPM), operates by detecting light. In order to detect alpha particles, a scintillating material 150 must be used to generate that light. The scintillating material 150 (such as Silver-doped Zinc Sulphide) generates photons when an alpha particle collides with it. Those photons can be received and amplified by the photomultiplier 140 to generate a current that can be detected, thereby detecting and counting the alpha particle disintegrations that occur within the inner dome 103.

Therefore the photodiode 130 and the photomultiplier 140 both act to detect alpha particles, but they operate in different ways and have different detection characteristics. For example, the photomultiplier 140 can detect a greater proportion of alpha decays by having a large area of scintillating material 150 and thereby responding to a greater proportion of alpha decays that occur within the diffusion chamber which gives better accuracy over the short term (more counts gives lower uncertainty), while the photodiode 130 can obtain energy spectral data which provides improved accuracy over the longer term.

As can be seen in FIG. 1, the photodiode 130 is positioned centrally with respect to the inner dome 103, while the photomultiplier 140 is offset from centre. The reason for this is that an electric field is set up between the photodiode 130 and the inner dome 103 by applying bias voltages to one or both of the photodiode 130 and the inner dome 103. A uniform electric field is desirable for easier (and accurate) modelling of the statistics of alpha particle collection on the photodiode 130. Having the photodiode 130 located centrally with respect to the inner dome 103 means that the electric field is symmetrical and therefore more uniform. The photomultiplier 140 does not rely on an electric field for operation and can therefore be offset from centre without significant impact on its operation. The central photodiode 130 and offset photomultiplier 140 can also be seen in FIGS. 2a and 3a which show the location of these components from above and show that they are centrally located in two dimensions on the printed circuit board 105. It can also be seen in these figures that the photomultiplier 140 is smaller in area than the photodiode which means that it, although its presence will provide a slight disturbance to the electric field, this is again not significant. The photodiode 130 and photomultiplier 140 are located adjacent to one another so that the total area occupied by both sensors 130, 140 on the printed circuit board 105 is minimized. The rest of the printed circuit board 105 is metallized so that it can form part of a Faraday shield as well as being held at the same potential as the inner dome 103 and thereby contributing to generation of the electric field.

In this example, scintillating material 150 is uniformly applied over the entire inner surface of the inner dome 103. This may be applied by painting or spraying or the like. As the whole of the inner dome 103 is covered with scintillating material 150, alpha particles striking any portion of the inner dome 103 will generate light and can be detected by the photomultiplier 140.

Electronics 160 are provided so as to provide biasing voltages to the inner dome 103, outer dome 106, photodiode 130 and photomultiplier 140, as well as processing circuitry to receive, amplify and process signals from the photodiode 130 and photomultiplier 140. These electronics 160 are provided on the opposite side of the printed circuit board 105 (the lower side as seen in FIG. 1) so that they do not interfere with the detectors 130, 140 and can be electromagnetically shielded from the sensitive volume of the inner dome 103. An additional Faraday shield 170 is provided around the electronics 160 so as to shield them from external electromagnetic influences which could interfere with the sensitive processing circuits that are required for the small signals received from detectors 130, 140.

FIG. 7 schematically shows the electronics 160, including amplifying circuit 131 that receives the output signal from photodiode 130 and amplifying circuit 141 that receives the output signal from photomultiplier 140. The signals from amplifying circuits 131, 141 feed into microprocessor 145 where the data can be processed and combined as discussed earlier. Microprocessor 145 also generates bias voltages for the detectors 130, 140 and the inner dome 103. These bias voltages will typically be of much greater magnitude than the operating voltage of the microprocessor which typically operates at around 3-5 V. The larger magnitude voltages may be generated by any suitable voltage conversion or boosting circuit. In FIG. 7 these are schematically illustrated as a photomultiplier bias circuit 146 which generates a bias voltage (e.g. of around 30 V) and applies it to the photomultiplier 140, a photodiode bias circuit 147 which generates a bias voltage (e.g. of around −70 V) and applies it to the photodiode 130, and a diffusion chamber bias circuit 148 which generates a bias voltage (e.g. of around 100 V) and applies it to the inner dome 103. With the example voltages given here, the electric field between the inner dome 103 and the photodiode 140 is generated by a voltage difference of 170 V and with a distance between inner dome 103 and photodiode 140 in the region of 1.5-2.5 cm, can create an electric field with strength in the region of 60 to 120 V/cm. The microprocessor (or indeed other parts of the electronics 150) may also output a ground connection (GND) that can be connected to the outer dome 106, thereby providing a safe surface for user contact and an electromagnetic shield for the inner dome 103.

FIGS. 2a and 2b show a radon gas sensor 100 with a double dome arrangement as in FIG. 1. FIG. 2a shows a top view of the printed circuit board 105 with electrical conductor 201 for making contact with the inner dome 103 and electrical conductor 202 for making contact with the outer dome 106. FIG. 2b shows a side view with the inner dome 103 and outer dome 106 in place.

FIGS. 3a and 3b are similar to FIGS. 2a and 2b, but show an embodiment in which there is no outer dome. Instead the photodiode 130 and photomultiplier 140 are surrounded only by the inner dome 103 which forms the diffusion chamber together with the printed circuit board 105. In this example, as there is no outer dome, the diffusion path does not depend on air passing between the two domes, but rather simply has to diffuse under the rim 104 of the inner dome 103. The gasket 120 shown in FIG. 1 could also be used in this embodiment, held against the printed circuit board 105 by the lip 122. In such cases the diffusion path will pass over the gasket, between the gasket and the lip, between the gasket and the outer surface of the inner dome 103 and then under the rim 104. Air channels 116 (visible in FIGS. 4a and 4b) may be formed in the lip 122 and the outer surface of the inner dome 103 to ensure that air can pass the gasket 120. The functionality of the gas sensor is otherwise the same as discussed above.

FIGS. 4a and 4b illustrate one method of applying scintillating material 150 to the inner surface of inner dome 103. In this embodiment, the scintillating material 150 is formed on an adhesive sheet 210 (shown in FIG. 4c). The adhesive sheet 210 has scintillating material 150 on one side and an adhesive on the other side that can adhere to the inner surface of the inner dome 103. A release sheet may be supplied to cover the adhesive layer until required. The release sheet is simply removed to expose the adhesive layer prior to adhesion in known manner.

FIG. 4a shows a view of the inside of the inner dome 103, viewed from the bottom (i.e. looking up at the interior side of the roof 220 of the inner dome 103. FIG. 4b shows a side view looking at one side wall 221 of the inner dome 103. The inner dome 103 in this embodiment has a rounded cuboid shape with a planar roof 220 and four side walls 221, 222, 223, 224 perpendicular to the roof 220 and with the edges and corners connecting the roof 220 and walls 221-224 all being rounded. The rounded edges 225 and rounded corners 226 make a more uniform electric field, avoiding the weak spots that can occur in sharp edges and corners.

In order to adhere scintillating material 150 onto the inside of the inner dome 103, a cross-shape 230 is cut from the adhesive sheet 210. The cross-shape 230 comprises a central square 235 with four legs 231, 232, 233 and 234 each extending from one side of the central square 235. The central square 235 is sized to approximately match the planar portion of the roof 220 of the inner dome 103 such that when the cross-shape 230 is adhered to the interior of the inner dome 103, the legs 231, 232, 233 and 234 extend over the rounded edges 225 of the inner dome 103 and down the respective side walls 221, 222, 223, 224. A notable feature of this arrangement is that the cross-shape extends over the rounded edges 225, but not over the rounded corners 226. This is advantageous as the rounded edges 225 are singly curved (also known as developable surfaces or surfaces with zero Gaussian curvature). On the other hand, the rounded corners 226 are doubly-curved (non-developable and having non-zero Gaussian curvature). A flat sheet, such as the sheet 210 cannot be laid over a non-developable surface like the rounded corners 226 without creasing. Creases or folds would reduce the uniformity and predictability of the response of the scintillating material 150 and are therefore undesirable. The cross-shape 230 thus avoids the non-developable surfaces and provides a good degree of area coverage on the inside of the inner dome 103 with good and known statistical response, decreasing uncertainty in the measurement.

FIG. 4c shows a tessellation of the cross-shape 230 used in FIGS. 4a and 4b. The particular cross-shape used here has legs 231, 232, 233, 234 which have a length (extending away from the central square 235) that is half the side length of the central square 235. As can be seen in FIG. 4c, this makes a perfectly tessellating pattern such that the only inefficiency of usage of the sheet 210 is at the edges. This is advantageous from a cost perspective as a single sheet 210 of scintillating material 150 can provide cross-shapes 230 for a large number of radon gas sensor units. There is a balance in that the length of the legs 231, 232, 233, 234 is relatively short compared with the likely geometry of the inner dome 103. This is shown in the side view of FIG. 4b (it should be noted that while this is a side view from the outside, the walls in this drawing are essentially transparent so that the position of the cross-shape 235 on the inside of the dome 103 can be seen). It can be seen here that the legs 231, 232, 233, 234 extend less down to less than half the height of the side walls 221, 222, 223, 224. While this reduces the amount of area in the inner dome 103 that is covered with scintillating material 150, the arrangement still provides a significant area of coverage which provides for a good rate of counting of alpha particle disintegrations.

An alternative cross-shape 235 is illustrated in FIGS. 5a, 5b and 5c (equivalent to FIGS. 4a, 4b and 4c). The cross-shape 235 in FIGS. 5a, 5b and 5c has longer legs 231, 232, 233, 234 with a leg length equal to the side length of the central square 235. As can be seen in FIG. 5c, the tessellation is imperfect so that the sheet 210 of scintillating material 150 is not used as efficiently. However, as shown in FIG. 5b, the legs 231, 232, 233, 234 extend nearly the full height of the side walls 221, 222, 223, 224, thereby increasing the sensitive area of scintillating material inside the inner dome 103 and correspondingly increasing the proportion of alpha particles detected.

FIG. 6 shows another way of increasing the area of scintillating material inside the inner dome 103. As shown in this figure, the surface of the printed circuit board 105 can be partially covered by a sheet 250 of scintillating material 150 with a hole 255 cut out so as not to block the photodiode 130 and photomultiplier 140. A further hole 257 is cut out to allow a diagnostic LED to shine into the inner dome 103 for testing the photodiode 130 and photomultiplier 140. The drawing on the left shows the upper surface (facing the inner dome 103) of the printed circuit board 105, while the drawing on the right shows the same surface covered by the sheet 250 of scintillating material 150. The scintillating material 150, if glued in place, should ideally be fully on the inside of the inner dome 103 (i.e. not extending under the rim 104. However, if the sheet 250 is thin enough (thinner than the rim projections 114) it can be held in place with guide pins 260 (FIG. 5b) of the inner dome 103 that are used to locate the inner dome 103 on the printed circuit board 105 (as in FIG. 6 right). Electrical connection will still be made via the rim projections 114.

It will be appreciated that many variations of the above embodiments may be made without departing from the scope of the invention which is defined by the appended claims.

The invention claimed is:

1. A radon gas sensor comprising:
   a diffusion chamber;
   a photodiode positioned inside the diffusion chamber; and
   a photomultiplier positioned inside the diffusion chamber;
   wherein a scintillating material is provided on at least a part of an inner surface of the diffusion chamber.

2. A radon gas sensor as claimed in claim 1, wherein the photodiode is positioned centrally with respect to the diffusion chamber.

3. A radon gas sensor as claimed in claim 1, wherein the photomultiplier is positioned offset with respect to the diffusion chamber.

4. A radon gas sensor as claimed in claim 1, wherein the photodiode and the photomultiplier are mounted to the same printed circuit board.

5. A radon gas sensor as claimed in claim 4, wherein the printed circuit board forms part of the diffusion chamber.

6. A radon gas sensor as claimed in claim 1, further comprising:
   sensor electronics arranged to receive photodiode data from the photodiode and arranged to receive photomultiplier data from the photomultiplier.

7. A radon gas sensor as claimed in claim 6, wherein the sensor electronics are arranged to combine the photodiode data with the photomultiplier data.

8. A radon gas sensor as claimed in claim 6, wherein the sensor electronics are arranged to generate an event count from the photomultiplier data and arranged to generate an energy spectrum from the photodiode data.

9. A radon gas sensor as claimed in claim 8, wherein the sensor electronics are arranged to combine the event count from the photomultiplier data with the energy spectrum from the photodiode data to generate a sensor output.

10. A radon gas sensor as claimed in claim 9, wherein the sensor electronics are arranged to apply one or more correction factors to the event count and the energy spectrum, wherein the one or more correction factors are calculated only from the energy spectrum.

11. A radon gas sensor as claimed in claim 6, wherein the sensor electronics are arranged to register an alpha particle count on the photodiode only when the energy is above a threshold value.

12. A radon gas sensor as claimed in claim 11, wherein the threshold is higher than the energy of a light flash generated by an alpha particle hitting the scintillating material.

13. A radon gas sensor as claimed in claim 11, wherein the threshold is lower than minimum expected energy of a radon alpha decay hitting the photodiode.

14. A radon gas sensor as claimed in claim 1, further comprising a photodiode bias circuit arranged to apply a photodiode bias voltage to the photodiode.

15. A radon gas sensor as claimed in claim 1, further comprising a photomultiplier bias circuit arranged to apply a photomultiplier bias voltage to the photomultiplier.

16. A radon gas sensor as claimed in claim 1, wherein the inner surface of the diffusion chamber is conductive and wherein the sensor further comprises a diffusion chamber bias circuit arranged to apply a diffusion chamber bias voltage to the inner surface of the diffusion chamber.

17. A radon gas sensor as claimed in claim 1, wherein the scintillating material is provided on a sheet attached to the inside surface of the diffusion chamber.

18. A radon gas sensor as claimed in claim 17, wherein the sheet is attached to developable surfaces of the inside of the diffusion chamber.

19. A radon gas sensor as claimed in claim 18, wherein part of the diffusion chamber is formed as a dome having four planar side walls and a planar roof, all connected by rounded corners and edges.

20. A radon gas sensor as claimed in claim 19, wherein the sheet is in the form of a cross having a central rectangle attached to the roof and four legs each extending onto a side wall.

21. A radon gas sensor as claimed in claim 20, wherein the cross has a central square attached to the roof and wherein the four legs each have a length equal to half the side length of the square.

22. A radon gas sensor as claimed in claim 1, wherein the photodiode is a PIN diode.

23. A radon gas sensor as claimed in claim 1, wherein the photomultiplier is a Silicon photomultiplier.

24. A radon gas sensor as claimed in claim 1, wherein the scintillating material is Silver-doped Zinc Sulphide.

25. A method of detecting radon gas comprising:
  acquiring first data from a photodiode positioned inside a diffusion chamber that has scintillating material provided on at least a part of an inner surface of the diffusion chamber; and
  acquiring second data from a photomultiplier positioned inside the diffusion chamber.

* * * * *